Figure 1:
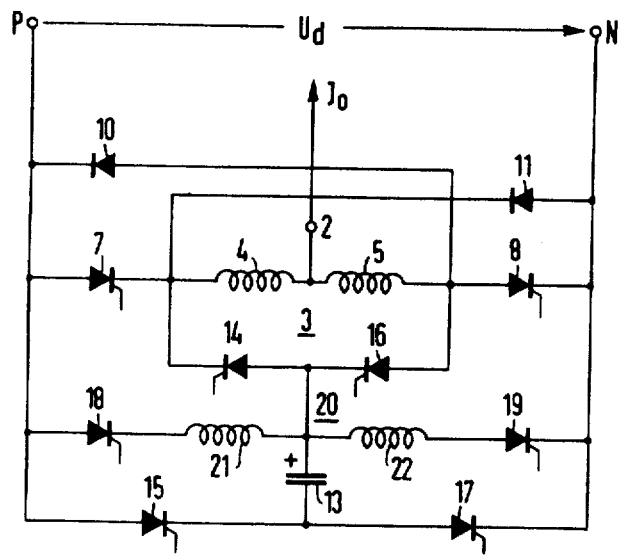

United States Patent
Tappeiner

[15] 3,676,763
[45] July 11, 1972

[54] SELF-COMMUTATING DIRECT-TO-ALTERNATING CURRENT INVERTER

[72] Inventor: Hermann Tappeiner, Erlangen, Germany

[73] Assignee: Siemens Aktiengesellschaft, Berlin and Munich, Germany

[22] Filed: Feb. 17, 1971

[21] Appl. No.: 116,198

[30] Foreign Application Priority Data

Feb. 19, 1970 Germany .................... P 20 07 567.6

[52] U.S. Cl. .......................................... 321/45 C, 321/45 R
[51] Int. Cl. ................................................. H02m 7/52
[58] Field of Search .................... 321/5, 45 C, 45 ER, 45 R

[56] References Cited

UNITED STATES PATENTS

| 3,543,131 | 11/1970 | Johnston | 321/45 ER |
| 3,555,397 | 1/1971 | Frank | 321/45 C |
| 3,405,346 | 10/1968 | Krauthamer | 321/45 C |
| 3,315,144 | 4/1967 | Poss | 321/45 R |

FOREIGN PATENTS OR APPLICATIONS

| 1,055,855 | 1967 | Great Britain | 321/5 |

*Primary Examiner*—William H. Beha, Jr.
*Attorney*—Curt M. Avery, Arthur E. Wilfond, Herbert L. Lerner and Daniel J. Tick

[57] ABSTRACT

A self-controlled inverter with constrained commutation comprises between its main positive and negative buses a series connection of two controlable main valves, such as thyristors, with an appertaining quenching network. A commutating reactor interconnects the two main valves in series with each other and has a midtap to which the load to be energized is attached. The quenching network has a quenching capacitor common to the two main valves and is connected, independently of the main valves, between a direct-voltage supply whose terminal polarity is selectable with respect to the electrodes of the quenching capacitor. The direct-voltage supply may either be constituted by the main buses of the inverter itself, or they may consist of a separate voltage source. In either case an after-charging network is preferably provided for replenishing the charge of the commutating reactor, the after-charging network having an inductance means connected between the quenching capacitor and the buses or other voltage supply.

5 Claims, 3 Drawing Figures

A SELF-COMMUTATING DIRECT-TO-ALTERNATING CURRENT INVERTER

My invention relates to self-commutating direct-to-alternating current inverters and in a more particular aspect to the electric devices contained in such an inverter for effecting the desired constrained commutation with the aid of a series connection of controlled main valves, such as thyristors, to which a quenching network is coordinated and which are connected with each other through a commutating reactor with a midtap to which the load is to be connected.

Such an inverter, as a rule, is provided with a quenching device which may contain a quenching capacitor common to both main valves. Preferably, such an inverter is further provided with free-wheeling diodes of which each is shunt connected to one of the respective main valves and the commutating reactor, the quenching capacitor being connected to one of the respective main valves and in series with the commutating reactor in the free-wheeling circuit of the main valve.

An inverter with a commutating device of the type just described has the advantage of requiring but a single quenching capacitor for the two controlled main valves of each alternating-voltage connecting lead.

However, it is necessary to provide such an inverter organization with an after-charging circuit for replenishing the charge of the commutating reactor; and the presence of the after-charging circuits in inverters of this type as heretofore known causes the occurrence of circulating currents, thereby placing an additional and undesirable electrical load upon the inverter circuitry, tending to reduce the resistance of the organization to the effect of idling currents.

It is an object of my invention, therefore, to improve inverter systems of the above-mentioned type so as to increase the resistance of the equipment to the occurrence of idling currents, particularly circulating currents caused by the after-charging network; and it is another, related object to minimize the electrical load imposed upon the inverter by the circulating currents occurring as a consequence of the after-charging equipment.

Another object of the invention is to afford connecting the quenching capacitor of such an inverter system to the terminals of a separate voltage source in order to afford operating the inverter with a variable input direct voltage.

To achieve these objects, and in accordance with a feature of my invention, I provide a self-commutating direct-to-alternating current inverter with a series connection of two controllable main valves with appertaining quenching means, and I connect a commutating reactor serially between the two main valves and provide the reactor with a midtap to which the load is to be connected. The quenching means comprise a quenching capacitor which is common to both main valves and which is connected independently of the main valves between direct-voltage supply terminals whose polarity can be selected in accordance with that of the quenching capacitor electrodes.

I preferably provide such a system with an after-charging network which has an inductance means connected between the quenching capacitor, on the one hand, and the terminals of the supply voltage, on the other hand. The supply voltage may be constituted by the main power buses of the system itself or by the buses of a separate voltage source.

Figure 2:
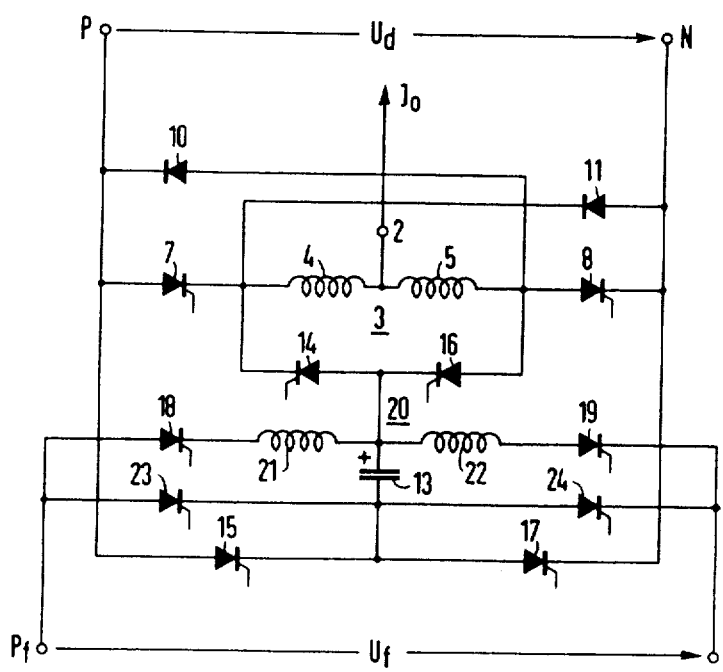
Figure 3:
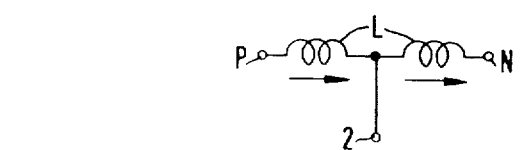

The foregoing and other objects, advantages and features of my invention, said features being set forth with particularity in the claims annexed hereto, will be apparent from the following description of the embodiments of inverters according to the invention illustrated by way of example on the accompanying drawings in which FIGS. 1 and 2 show respective electric circuit diagrams of inverter systems, the quenching capacitor in the system of FIG. 1 being replenishable from the input voltage of the inverter, whereas in the embodiment of FIG. 2 the quenching capacitor is connected with the terminals of a separate current source. FIG. 3 shows schematically how a load may be connected to the terminals denoted by 2, P and N in FIGS. 1 and 2. In all of the illustrations, identical components are denoted by the same reference characters respectively.

According to FIGS. 1 and 3, a load (L in FIG. 3) is connected to the midtap 2 of a commutating reactor 3 whose component windings are denoted by 4 and 5. The windings 4 and 5 are connected, in series with two controllable main valves 7 and 8, such as thyristors, to the input direct voltage $U_d$ of a self-controlled inverter. The bus terminals of the input direct voltage $U_d$ are denoted by P and N. To each series connection of one of the main valves 7 or 8 with the commutating reactor 3 there is connected a free-wheeling diode 10 or 11 in parallel relation. The device for constrained commutation of the load current comprises, for both main valves 7 and 8, a single quenching capacitor 13 which can be connected by means of two quenching valves 14 and 15 in parallel relation to the main valve 7, and by means of two further quenching valves 16 and 17 in parallel relation to the main valve 8. Consider, for example, a moment at which the main valve 7 and the component reactor 4 are traversed by load current, and assume that at this moment the quenching capacitor 13 is fully charged to the amount of the input direct voltage at the polarity indicated by + in FIG. 1. When the current in main valve 7 is to be interrupted, the quenching valves 14 and 15, both being controllable and consisting, for example, of thyristors with appertaining firing control circuits, are ignited, and the quenching capacitor 13 discharges through the main valve 7 so that the latter is quenched.

As soon as the flow of current through this main valve 7 has ceased, the quenching capacitor 13 swings through the two quenching valves 14 and 15 and the component reactors 4, 5 as well as the free-wheeling valve 10, to now become charged at the reverse polarity. The load current $I_0$ continues to flow through the valves 14 and 15, the capacitor 13 and the component reactor 4; and this continued current flow becomes superimposed upon the reverse swinging current of the capacitor. As soon as the recharging current becomes smaller than the load current $I_0$, the load current continues flowing through the free-wheeling valve 11.

Prior to the beginning of the reverse swinging phenomenon, the current in the component reactor 4 is equal to the current at the termination of the reverse swing. The commutating capacitor 13, therefore, does not receive a load-responsive charge. Upon termination of the reverse swing, the capacitor has approximately the same charging voltage except that the sign is reversed in comparison with the polarity obtaining before the current in the main valve 7 was interrupted. For after-charging the quenching capacitor, there are provided two controllable valves 18 and 19 which are connected in series with a small inductivity 20 comprising component windings 21 and 22. The quenching capacitor 13 is connected with the midtap of the inductivity member 20. The two halves 18 and 19 are connected to the terminals or buses P and N of the input voltage $U_d$. Due to the ignition of the valve 19 at the termination of the burning duration of the quenching valve 15, or by ignition of the valve 18 and the termination of the burning duration of the quenching valve 17, a charging current comes about through the valves 19 and 15 or 18 and 17. Due to the effect of this after-charging device, the commutating capacitor 13, even if the inverter is not loaded, is always charged with voltage which is higher than $U_d$ and which possesses the correct polarity.

The main valves 7, 8 are ignited only when the current in the quenching valves 15 or 17 has gone to zero. This avoids the occurrence of circulating currents as could otherwise pass through the commutating reactor 3, the main valve 8 and the free-wheeling valve 11, or through the commutating reactor 3, the main valve 7 and the free-wheeling valve 10. Such circulating currents would impose an impermissible load upon the inverter. Without the use of after-charging devices, such circulating currents are necessary in order to make the inverter resistant to idling operation.

It has been emphasized above that after the reverse swing, the quenching capacitor 13 exhibits an only slight voltage of the opposed polarity. The after-charging device, therefore, is called upon only to take care of the energy losses that occur during the reverse swinging performance. The after-charging device thus operates with slight energy only.

The inverter system shown in FIG. 2 is to a large extent similar to that of FIGS. 1 and 3 so that it will suffice to describe the differences. According to FIG. 2, the valves 18 and 19 are connected with the terminals $P_f$ and $N_f$ of a separate voltage source $U_f$. The second electrode of the quenching capacitor 13 is likewise connected with the terminals $P_f$ and $N_f$ of the separate source, the connection extending through controllable valves 23 and 24. When the valves 18 and 24 or 19 and 23 are ignited at the proper moment in accordance with the rhythm prescribed, then the charging current will flow and the commutating capacitor 13 is after-charged to a voltage slightly above $U_f$. As a result, the voltage at the quenching capacitor 13 becomes independent of the input direct voltage $U_d$. For that reason, the inverter of FIG. 2 may be operated with a variable input voltage $U_d$.

To those skilled in the art it will be obvious upon a study of this disclosure that my invention permits of various modifications and may be given embodiments different from those illustrated and described herein, without departing from the essential features of my invention and within the scope of the claims annexed hereto.

I claim:

1. A self-commutating direct-to-alternating current inverter, comprising a source of direct voltage having supply terminals;

respective positive and negative main buses connected to the source of direct voltage;

a series connection of first and second controllable main valves connected to the main buses;

a commutating reactor serially interconnecting the main valves and having a midtap for connection to a load to be energized;

a first free-wheeling diode connected in antiparallel relation with the series connection of the first main valve and the commutating reactor;

a second free-wheeling diode connected in antiparallel relation with the series connection of the second main valve and the commutating reactor;

quenching means for quenching the first and second main valves, said quenching means comprising a first series connection of first and second controllable quenching valves connected to the commutating reactor in antiparallel direction relative to the first and second main valves, a second series connection of third and fourth controllable quenching valves connected to the commutating reactor in parallel direction relative to the series connection of the first and second main valves, and a quenching capacitor having a first electrode connected to a common point in the connection between the first and the second quenching valves and a second electrode connected to a common point in the connection between the third and fourth quenching valves, said quenching capacitor being connected between the supply terminals of the source of direct voltage independently of the main valves; and means for firing the first and third quenching valves at the same time so that the quenching capacitor is conductively connected to the first main valve, and for firing the second and fourth quenching valves at the same time so that the quenching capacitor is conductively connected to the second main valve.

2. An inverter as claimed in claim 1, further comprising an after-charging network having a first controllable charging valve connected between the positive bus and the first electrode of the quenching capacitor, and a second controllable charging valve connected between the first electrode of the quenching capacitor and the negative bus whereby said buses provide the voltage supply for said quenching capacitor.

3. An inverter as claimed in claim 1, further comprising additional voltage supply means, and an after-charging network having respective positive and negative terminals forming part of the additional voltage supply means and a bridge arrangement of four controllable charging valves connected to the terminals of the additional voltage supply means.

4. An inverter as claimed in claim 2, wherein the after-charging network has inductance means serially connected to the series connection of the first and second charging valves.

5. An inverter as claimed in claim 3, wherein the bridge arrangement of the after-charging network has inductance means connected between the quenching capacitor and the terminals of the additional voltage supply means.

* * * * *